United States Patent [19]

Sandage

[11] Patent Number: 5,217,189
[45] Date of Patent: Jun. 8, 1993

[54] SUSPENSION FLIGHT CONTROL METHOD AND APPARATUS

[76] Inventor: Merle T. Sandage, 1716 South Ash, Independence, Mo. 64052

[21] Appl. No.: 876,048

[22] Filed: Apr. 30, 1992

[51] Int. Cl.⁵ .............................................. B64C 13/30
[52] U.S. Cl. .................................... 244/233; 244/900; 244/904; 244/232
[58] Field of Search ............... 244/904, 900, 232, 233, 244/75 R

[56] References Cited

U.S. PATENT DOCUMENTS

| 821,393 | 5/1906 | Wright | 244/904 X |
| 4,860,970 | 8/1989 | Roselli | 244/900 X |

FOREIGN PATENT DOCUMENTS

| 3736255 | 5/1989 | Fed. Rep. of Germany | 244/904 |
| 3826856 | 2/1990 | Fed. Rep. of Germany | 244/904 |
| 2512417 | 3/1983 | France | 244/904 |
| 2609445 | 7/1988 | France | 244/904 |
| 2050263 | 1/1981 | United Kingdom | 244/904 |

Primary Examiner—Joseph F. Peters, Jr.
Assistant Examiner—Christopher P. Ellis
Attorney, Agent, or Firm—Hovey, Williams, Timmons & Collins

[57] ABSTRACT

A flight control apparatus for use in an aircraft includes support structure for suspending a pilot beneath a pair of wings while permitting movement of the pilot relative to the aircraft in the forward, rearward and both lateral directions. A control system is connected between the support structure and the wings for altering the geometries of the wings during flight to vary the drag and lift characteristics of the wings and alter the direction of flight and the speed/performance range of the aircraft in response to movement of the pilot relative to the aircraft in any of the forward, rearward, and lateral directions. The geometries of the wings are altered during flight by moving the leading edges between extended and retracted positions relative to the central longitudinal axis of the aircraft in response to movement of the pilot in the forward, rearward and both lateral directions relative to the aircraft.

11 Claims, 5 Drawing Sheets

SUSPENSION FLIGHT CONTROL METHOD AND APPARATUS

BACKGROUND OF THE INVENTION

1. Field of the Invention

The present invention relates generally to devices for controlling the direction and speed of aircraft and, more particularly, to a flight control apparatus and method for controlling the direction and speed of flight of an aircraft in response to movement of a pilot's body relative to the aircraft.

2. Discussion of the Prior Art

The sport of hang gliding involves flying through the air suspended by a harness beneath a large type of kite or glider constructed especially for the purpose. In order to turn a conventional kite, a pilot is required to shift his body relative to the kite in the direction of the desired turn, thus loading the inner wing causing the non-rigid wing material to billow relative to the outer wing. This change in the shape of the wings and the relative inequalities in the wing loading creates more lift and less drag in the outer wing so that a turn is initiated toward the inner wing. A turn in the opposite direction is carried out in an identical fashion by the pilot leaning in the opposite lateral direction.

In order to slow the flight speed of the kite, the pilot pushes his body rearward relative to the glider by pushing forward on a control bar forming a part of the kite. This action increases the angle of attack of the wings causing the glider to slow. Thus, the kite slows when the pilot moves rearward of a centered position increasing the angle of attack and accelerates when the pilot moves forward decreasing the angle of attack.

This conventional operation remains useful where kites or gliders are constructed with non-rigid, flexible wings which billow when loaded as discussed above. However, glider designs have evolved which provide much higher performance than traditional "kites". These gliders are constructed with tighter, stiffer wings in order to increase the lift and speed of the gliders. As this development work has proceeded, designers have become aware of a trade-off between such high performance characteristics, and handling of the glider.

Specifically, as a glider design is modified to tighten or stiffen the glider, the glider becomes naturally resistive to roll and is more difficult for a pilot to handle. In contrast, if a glider is designed for ease of handling, it is not as tight, having a higher drag than high performance gliders as well as less lift.

Although most pilots cope with the increased roll resistance of high performance gliders by employing different turning techniques than those used with more friendly gliders, it would be desirable to provide a flight control apparatus that would improve handling of high performance gliders while permitting the pilot to employ the same turning and speed control techniques used with lower performance gliders.

OBJECTS AND SUMMARY OF THE INVENTION

It is an object of the present invention to satisfy this need in the art, and to provide a suspension flight control method and apparatus for an aircraft that will alter the wing geometry in order to increase the drag and reduces the lift of one wing while decreasing the drag and increasing the lift of the other wing during turning in order to improve control of a turn in either direction.

Thus, it is an aim of the invention to provide mechanical enhancement of handling characteristics such as turning of the aircraft.

Further, it is an object of the invention to provide such a suspension flight control method and apparatus which will alter the wing geometry to increase the drag and reduce the lift of both wings when a pilot moves away from the control bar, and will decrease drag and increase lift when he moves toward the control bar.

Another object of the invention is to provide a control method and apparatus that will produce a predetermined control of the aircraft dependent upon the direction of movement of the pilot so that no additional pilot movement beyond that typically employed to control the aircraft is necessitated by the apparatus. Such a method and apparatus finds particular utility in use with a glider having high performance "flex" wings.

In accordance with the present invention, a suspension-type flight control apparatus is provided with support structure for suspending a pilot beneath the wings of an aircraft and permitting movement of the pilot relative to the aircraft in the forward, rearward and both lateral directions relative to the aircraft. A control means is connected between the support structure and the wings for altering the geometries of the wings during flight to vary the drag and lift characteristics of the wings and alter the direction and speed of flight in response to movement of the pilot relative to the aircraft in any of the forward, rearward, and lateral directions.

Preferably, each wing includes a leading edge movable between a retracted position and an extended position relative to the central longitudinal axis of the aircraft, and a non-rigid or semi-rigid wing surface extends rearward from the leading edge. The wing surface is supported on the leading edge under greater tension when the leading edge is in the extended position than when the leading edge is in the retracted position.

Further, the support structure preferably includes a support bar mounted on the aircraft for universal pivotal movement, and the pilot is suspended from the support bar. The control means includes a cable extending between the support bar and each of the leading edges for carrying out movement of the leading edges between the extended and retracted positions when the pilot moves relative to the aircraft.

Thus, upon forward movement of the pilot, the leading edges of the wings are moved toward the extended positions and the geometries of both wings are altered to provide decreased drag and increased lift in order to increase the speed/performance range of the aircraft. Upon rearward movement of the pilot the leading edges of the wings are moved toward the retracted positions and the geometries of both wings are altered to provide increased drag and decreased lift in order to decrease the speed/performance range of the aircraft.

During turning, the pilot moves laterally in one direction and the leading edge of the one wing is moved toward the retracted position so that the geometry of the one wing provides increased drag and decreased lift while the leading edge of the other wing is moved toward the extended position so that the geometry of the other wing provides decreased drag and increased lift.

BRIEF DESCRIPTION OF THE DRAWING FIGURES

A preferred embodiment of the present invention is described in detail below with reference to the attached drawing figures, wherein.

DETAILED DESCRIPTION OF A PREFERRED EMBODIMENT

Figure 1:
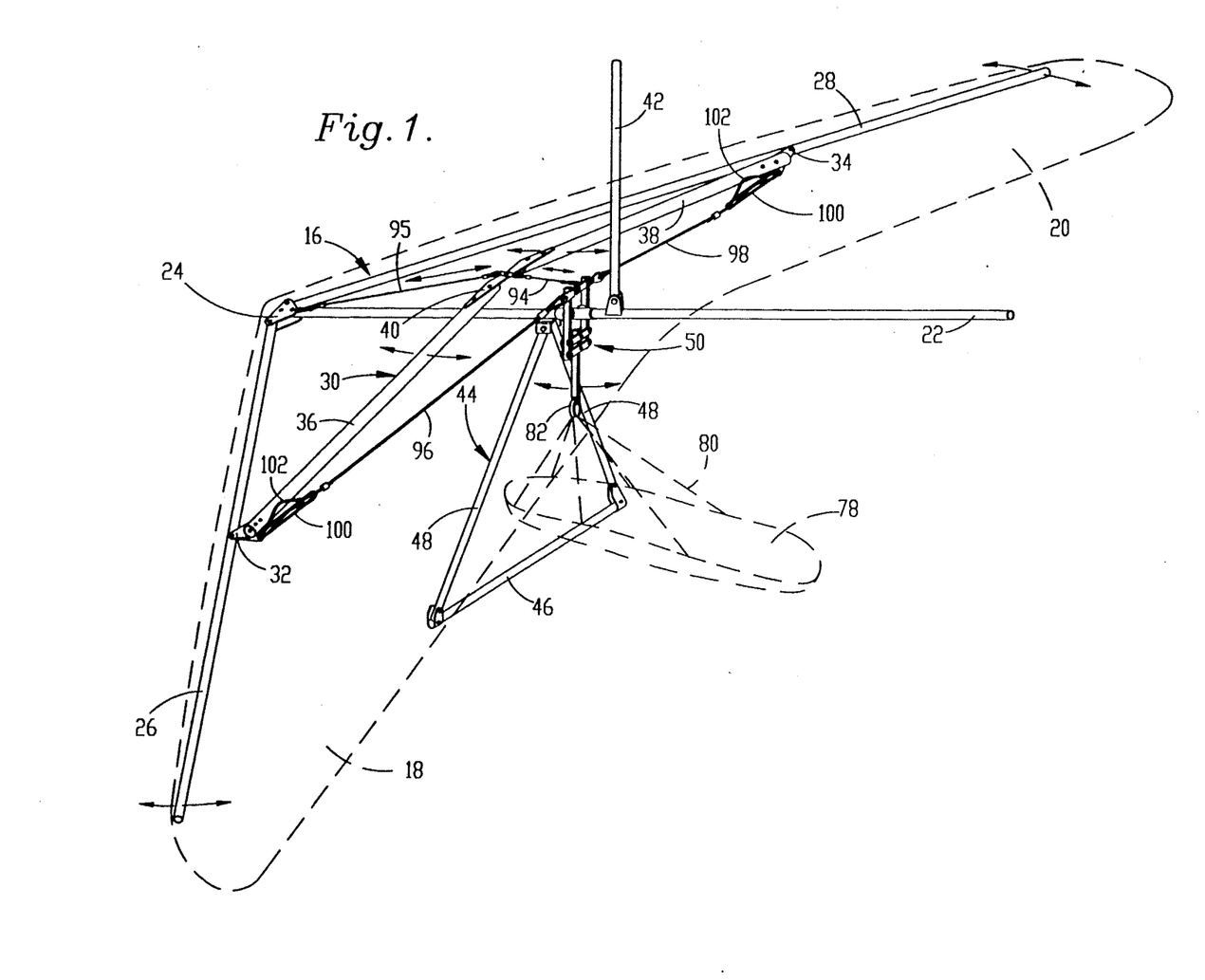
FIG. 1 is a perspective view of a glider aircraft constructed in accordance with a first preferred construction of the present invention, with the wing material shown in dashed lines in order to illustrate the interior of the wings and the structure beneath the wings.

A glider aircraft constructed in accordance with a first preferred construction of the present invention is shown in FIG. 1. The glider aircraft broadly includes a frame 16 constructed of conventional aircraft-quality materials, and a pair of wings 18,20 defined by the frame and formed of non-rigid, pliant sail cloth or the like, illustrated in dashed lines, which defines the control surfaces of the wings.

The frame of the aircraft includes a keel 22 extending the length of the aircraft and defining the central longitudinal axis thereof. A nose plate 24 is attached to the forward end of the keel, and a leading edge 26, 28 of each wing is pivotally secured to the nose plate. Each leading edge is pivotable relative to the keel between a retracted position defining a relatively small angle, of about 65°, between the leading edge and keel, and an extended position defining a larger angle.

A cross-bar assembly 30 extends above the keel and between the two leading edges, and is fastened to each of the leading edges at a leading edge/cross-bar junction 32, 34 by a pivotable connection. The cross-bar assembly floats relative to the keel, and includes two cross-bar members 36, 38 connected together by a center plate 40 which permits pivotal movement of the cross-bars forward and rearward relative to the nose plate.

A king post 42 is fastened to the keel intermediate the ends thereof and extends upward in a direction substantially perpendicular to the keel. Although not shown in the figures, tension cables are provided which extend between the top of the king post and the leading edge/cross-bar junctions in order to provide support for negative loads.

A control bar assembly 44 is supported on the keel, and includes a horizontal base tube 46 and a pair of angled upright tubes 48 extending between the base tube and the keel. The upright tubes are fastened directly to the keel and, although not shown in the figures, tension cables extend between the base tube and the front and rear ends of the keel, as well as between the base tube and the leading edge/cross-bar junctions. These cables stabilize the control bar assembly.

The geometries of the wings of the glider are defined partially by the leading edges and the angles formed between the leading edges and the keel, and also by the wings themselves which deform during flight depending upon the manner in which the wings are loaded and upon the amount of tension exerted on the wing material by the frame. Battens or the like are also provided in high performance gliders to give the wings additional shape and stiffness.

A geometry adjusting suspension flight control system is provided on the glider, and includes a support assembly 50 and control means connected between the support assembly and the wings for altering the geometries of the wings during flight upon movement of the pilot relative to the aircraft in the forward, rearward and both lateral directions. All parts of the geometry adjusting suspension flight control system are formed of conventional aircraft quality materials having the characteristics necessary to withstand the loading requirements expected of those parts during the life of the system.

Figure 2:
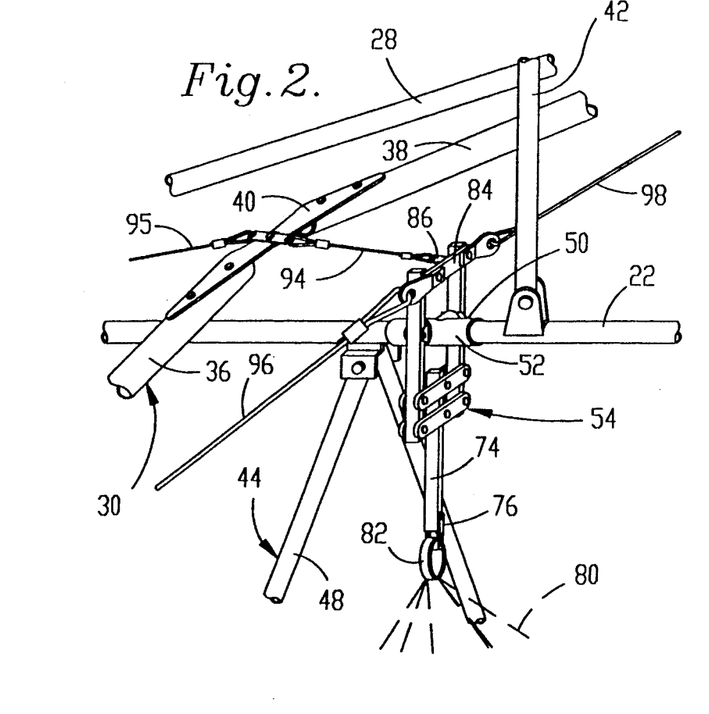
FIG. 2 is a partial perspective view of the glider aircraft illustrated in FIG. 1, showing the support structure employed in the aircraft.
Figures 3, 5:
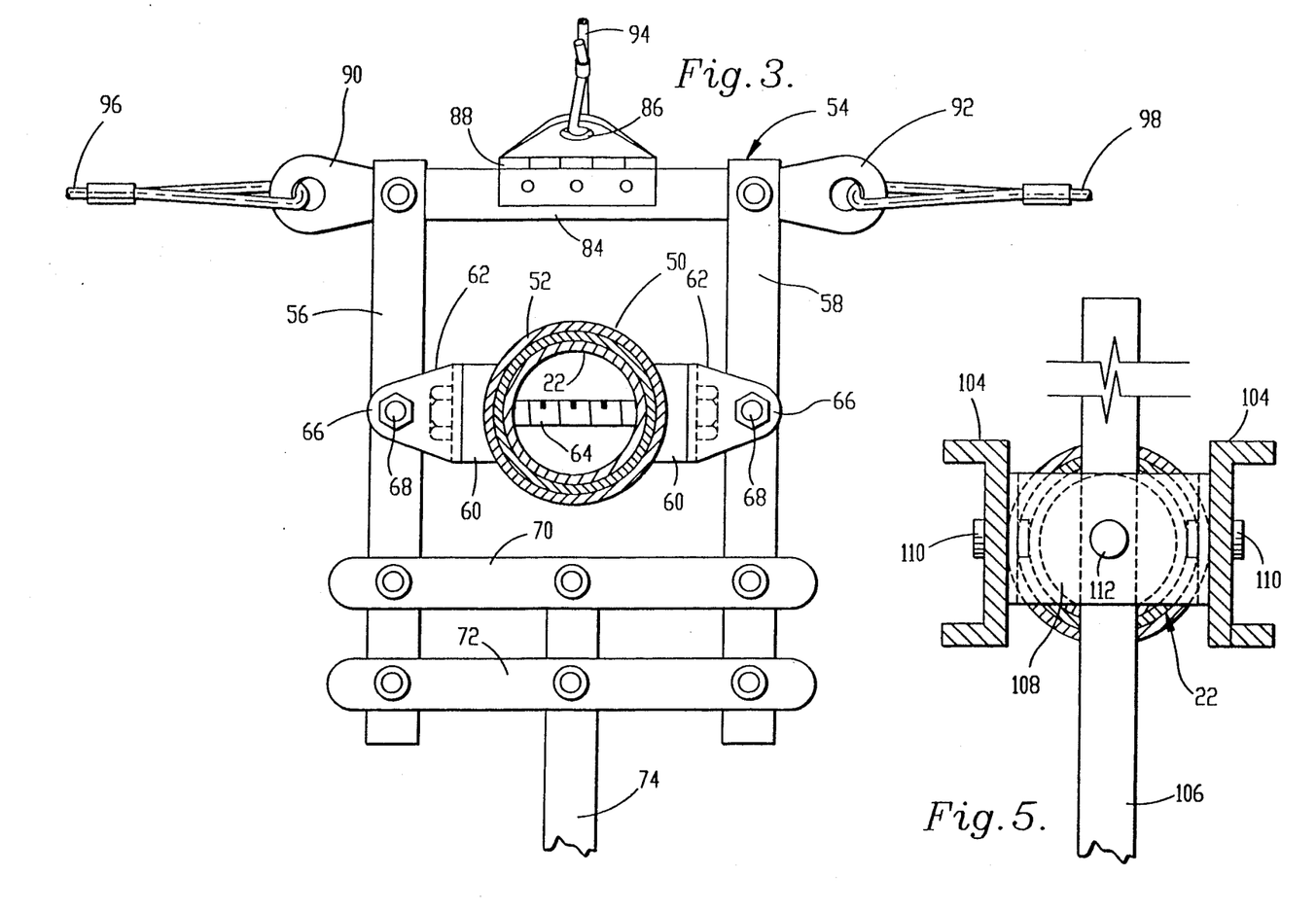
FIG. 3 is a front cross-sectional view of the keel of the glider aircraft illustrated in FIG. 1, illustrating the support structure.
FIG. 5 is a cross-sectional view of the keel of the glider aircraft illustrated in FIG. 4, illustrating the support structure.

Turning to FIG. 2, the support assembly includes a sleeve 52 that is fixed to the keel and which remains stationary relative to the keel, and a linkage assembly 54 mounted for universal pivoting movement relative to the sleeve. As shown in FIG. 3, the linkage assembly includes two parallel links 56, 58 which extend vertically to the sides of the sleeve.

A saddle 60 is secured to each side of the sleeve and includes a mounting bracket 62 that is supported on the saddle by a bolt 64 or the like extending between the brackets through the sleeve and keel. The brackets may be rotated about the axis of the bolt 64, which extends in a direction perpendicular to the longitudinal axis of the sleeve. Each mounting bracket 62 includes a pair of ears 66 between which one of the vertical links extends. Each link 56, 58 is secured to one of the brackets by a bolt 68 or the like while being free to pivot about the axis of the bolt, which extends in a direction parallel to the longitudinal axis of the sleeve.

By providing structure permitting pivotal movement about axes both parallel and perpendicular to the sleeve axis, universal pivoting movement of the parallel links is permitted relative to the sleeve.

Two pairs of parallel horizontal links 70, 72 are fastened between the vertical links 56, 58 adjacent the lower ends thereof. These links 70, 72 are supported on the vertical links for pivoting movement and each pair is spaced vertically from the other along the lengths of the vertical links. A depending support bar 74 extends downward between the links of each pair of links 70, 72, and is secured to the link pairs at the centers thereof in such a way as to be pivotable relative to the links. This depending support bar is provided with a shackle 76 at the lower end thereof.

Returning to FIG. 1, a harness 78 is provided for supporting the pilot beneath the wings of the glider and in proximity to the base tube 46 of the control bar 44. A plurality of hang straps 80 are connected to the harness and extend upward toward the support assembly. Webbing 82 extends between the shackle and the hang straps for securing the hang straps to the support assembly via the support bar 74. A carabiner is interposed between the webbing and the harness hang straps to permit quick disconnect of the harness. By connecting the pilot to the support assembly in this manner, when the pilot moves laterally in either direction, or forward or rearward relative to the glider, this movement is transmitted to the support assembly 50 causing the linkage assembly 54 to pivot relative to the keel 22.

As shown in FIG. 3, a horizontal cross link 84 is attached between the top ends of the vertical links 56, 58 by a suitable connection which permits pivoting movement of the link relative to the vertical links. An eyelet 86 is attached to the center of the horizontal link and is secured to the link by a hinge 88 which permits the eyelet to swing about an axis extending in a direction parallel to the link. An additional eyelet 90, 92 is supported at the upper end of each vertical link 56, 58, and these eyelets are pivotable about axes, each of which extend in a direction perpendicular to both the vertical links and the horizontal link.

Returning to FIG. 2, a tension cable 94 is fastened to the central eyelet 86 and extends between the eyelet and a similar eyelet provided on the center plate 40 of the cross-bar assembly. An additional cable 95 extends from another eyelet provided on the center plate to an eyelet provided on the nose plate 24, as shown in FIG. 1.

This cable 95 prevents the center plate, and thus the cross-bars, from pivoting rearward away from the nose plate beyond a predetermined distance defined by the length of the cable. A roll-enhancement cable 96 is attached the lateral eyelet 90 nearest the left-hand wing, and extends between the eyelet and an eyelet provided at the leading edge/cross-bar junction 32 of the left-hand wing. Another roll-enhancement cable 98 extends between the eyelet 92 and an eyelet provided at the leading edge/cross-bar junction 34 of the right-hand wing.

Preferably, an extension permitting means is provided on each of the cables for permitting limited extension of the length thereof under certain flight conditions. This means preferably includes one or more loops of flexible cord 100, such as bungee cord, which is secured between one end of each roll-enhancement cable 96, 98 and the eyelets of the leading edge/cross-bar junctions 32, 34. A lanyard 102 is also provided to limit the maximum amount of extension of the cables 96, 98.

Although the extension limiting means is illustrated as being located at the leading edge/cross-bar junctions, it is possible to position these means anywhere along the lengths of the cables 96, 98, in order to permit accessibility thereto.

Referring to FIG. 1, during normal forward flight of the glider, if the pilot desires to slow the air speed of the glider, he pushes the base tube 46 of the control bar assembly forward so that his body is moved rearward relative to the glider. This movement is transmitted through the harness 78, the hang straps 80 and webbing 82 to the support assembly 50, causing the vertical links 56, 58 of the linkage assembly 54 to pivot in a counterclockwise direction, as viewed in the figure.

The pivotal movement of the vertical links causes the cables 94, 95 to be relaxed, which in turn permits the center plate 40 of the cross-bar assembly 30 to move toward the nose plate. Movement of the center plate causes the cross-bars 36, 38 to close, bringing the leading edges 26, 28 of the wings toward the retracted positions. In this manner, the geometries of the wings are altered in an identical fashion, resulting in a loosening of the material forming the wings. Such loosening or billowing of the wings increases the drag on the glider while reducing lift such that the operational speed range of the glider is lowered allowing lower landing speeds.

At the same time that the cables 94, 95 are relaxed, the roll-enhancement cables 96, 98 are tensioned, further facilitating movement of the leading edges 26, 28 toward the retracted positions. Thus, the cables 94, 96, 98 of the suspension system work together to alter the geometries of the wings to achieve the desired flight characteristics.

When the pilot pulls on the base tube 46 of the control bar assembly, his body moves forward relative to the glider, and the linkage assembly is pivoted in the clockwise direction, as viewed in FIG. 1. This clockwise movement increases the tension in the cables 94, 95 urging the center plate 40 and cross-bars 36, 38 toward their rearmost limit position. Thus, the cross-bars urge the leading edges 26, 28 outward from the keel 22 toward their extended positions, altering the geometries of the wings and stretching the material in the wings to a tightened condition. In this manner, drag is reduced and lift increased such that the operational speed range of the glider is increased permitting greater speeds at all angles of attack of the glider.

As during pivoting movement of the linkage assembly in the counterclockwise direction, the roll-enhancement cables 96, 98 are tensioned when the linkage assembly pivots in the clockwise direction. However, during pilot movement in the forward direction it is desired to position the leading edges 26, 28 in an extended position, and such movement is not facilitated by tensioning of the roll-enhancement cables 96, 98. By providing the extension permitting means between the cables 96, 98 and the leading edges, the leading edges are permitted to move forward toward the extended positions during clockwise pivotal movement of the linkage assembly, and the flexible cords 100 and lanyards 102 permit a limited amount of temporary extension of the cables and prevent the cables from restricting forward movement of the leading edges.

In order to turn the glider in either direction, the pilot moves his body in the direction of the desired turn, causing the linkage assembly to pivot about the axes defined by the bolts 68 attaching the vertical links 56, 58 to the brackets 62, as shown in FIG. 3. Thus, as viewed in FIG. 1, if the pilot desires to make a right-hand turn, he leans to the right and this movement is transmitted to the linkage assembly which pivots in a counterclockwise direction about the keel.

The pivoting movement of the linkage assembly causes the left-hand roll-enhancement cable 96 to be relaxed while the right-hand roll-enhancement cable 98 is tensioned. In this manner, the leading edge 28 of the right-hand wing is pulled toward the retracted position while the left-hand leading edge 26 is moved toward the extended position. Although the cable 94 is also further tensioned, this has no adverse effect on the movement of the leading edge of the right-hand wing toward the retracted position, and facilitates movement of the leading edge of the left-hand wing toward the extended position.

Figure 8:
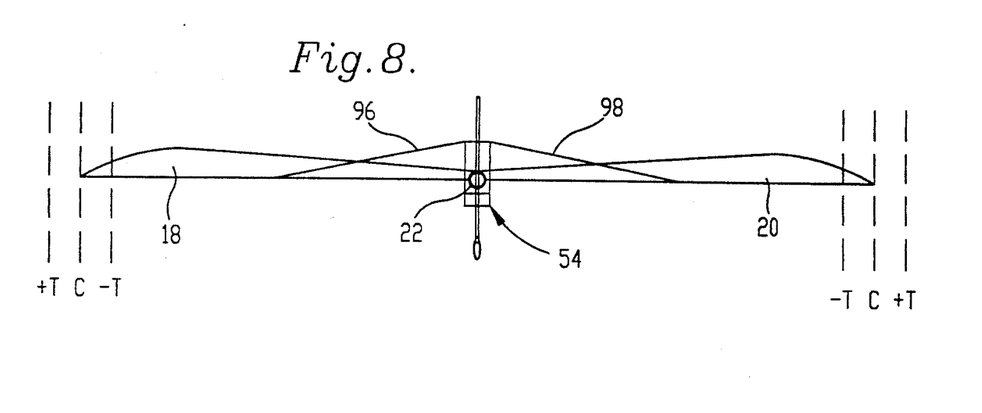
FIG. 8 is a schematic rear elevational view of a glider aircraft constructed in accordance with the embodiment illustrated in FIG. 1, showing the glider in normal forward flight.
Figures 9, 10:
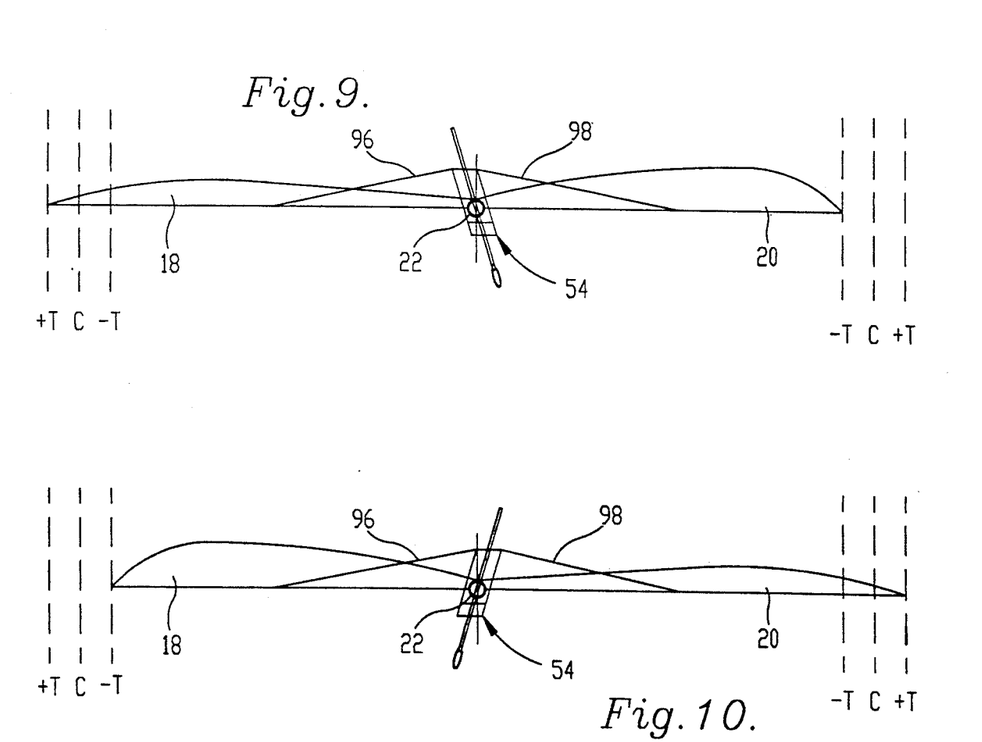
FIG. 9 is a schematic rear elevational view of a glider aircraft constructed in accordance with the embodiment illustrated in FIG. 1, showing the glider in a right-hand turn.
FIG. 10 is schematic rear elevational view of a glider aircraft constructed in accordance with the embodiment illustrated in FIG. 1, showing the glider in a left-hand turn.

The glider is illustrated schematically in FIGS. 8–10, during straight and level flight as well as during right-hand and left-hand turns. Turning first to FIG. 8, when the glider is traveling in a straight and level direction, the outermost tips of both wings are on center, as designated by the dashed lines identified by a C.

However, during a right-hand turn, as shown in FIG. 9, movement of the pilot to the right causes counterclockwise rotation of the linkage arrangement, and the leading edge of the left-hand wing is extended while the right-hand wing is retracted. These movements result in travel of the wing tips from the centered positions to the positions illustrated in FIG. 9, wherein the tip of the left-hand wing experiences positive travel away from the keel and the tip of the right-hand wing experiences negative travel. At the same time, the right-hand wing billows due to the decreased tension on the wing material, and drag on the wing increases while the lift created by the wing decreases. The material in the left-hand wing is stretched during a right-hand turn, and drag is reduced while lift is increased.

The differences in drag and lift between the two wings cause the right-hand wing to slow and sink while the left-hand wing accelerates and rises. Thus, a turn is initiated and continues until the pilot centers himself relative to the glider.

A turn to the left is illustrated in FIG. 10, wherein movement of the pilot causes a clockwise pivoting of the linkage arrangement. Thus, the leading edge of the left-hand wing is pulled toward the retracted position while the leading edge of the right-hand wing is urged toward the extended position. The results of these movements include causing negative travel by the tip of the left-hand wing and positive travel away from the keel by the tip of the right-hand wing.

Figure 4:
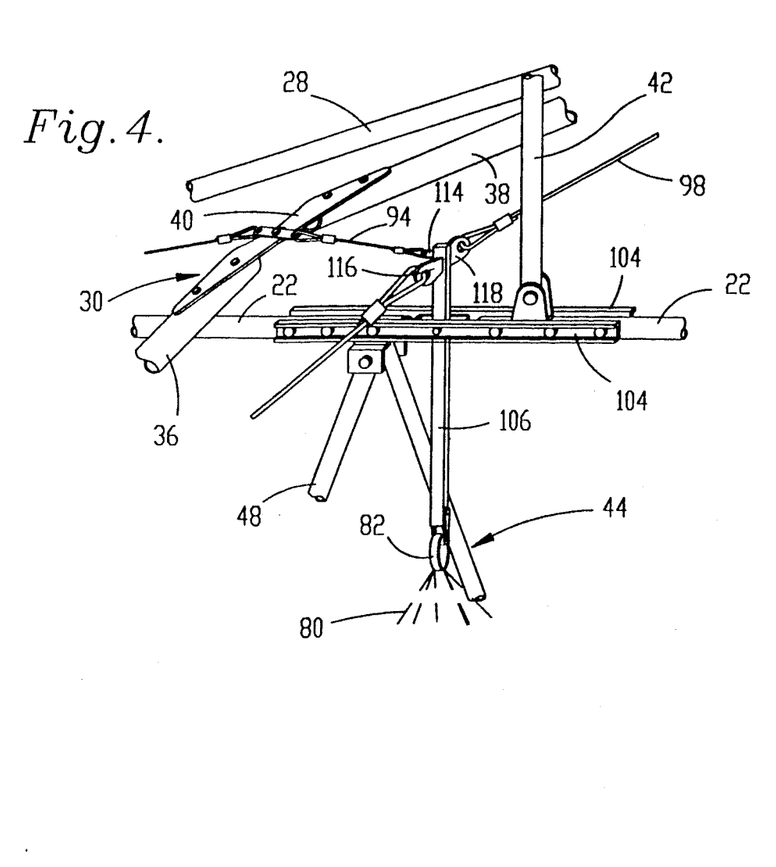
FIG. 4 is a partial perspective view of a glider aircraft, illustrating a further construction of the support structure employed in the aircraft.

An alternate construction of the support assembly is shown in FIGS. 4 and 5. Turning first to FIG. 4, a section of the keel forward of the king post is removed, and replaced by a pair of channels 104 which are secured at the ends to the remaining sections of the keel 22. Thus, a modified keel is defined which includes a central longitudinal aperture through which a support bar 106 extends.

As shown in FIG. 5, the support bar is secured between the channels by a hollow block 108. The block is fastened to the channels by bolts 110 or the like which permit the block to pivot about the axes of the bolts. The support bar extends through the center of the hollow block and is secured in position by a bolt 112 or the like which permits the bar to pivot about the axis of the bolt. By providing this construction, universal pivoting movement of the bar is permitted relative to the keel.

Returning to FIG. 4, eyelets 114, 116, 118 are provided at the top end of the support bar and function identically to the eyelets described above. Thus, operation of a glider provided with this modified construction of a support assembly operates in the same manner as the first preferred construction described above.

Figure 6:
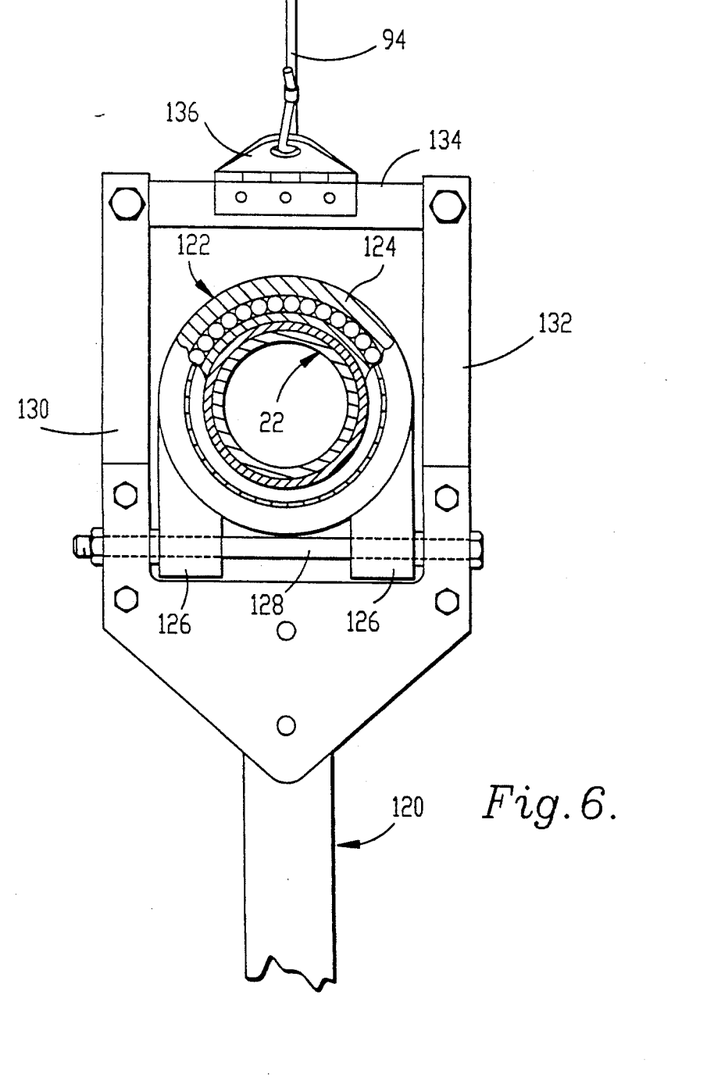
FIG. 6 is a cross-sectional view of the keel of a glider aircraft illustrating a still further construction of the support structure.
Figure 7:
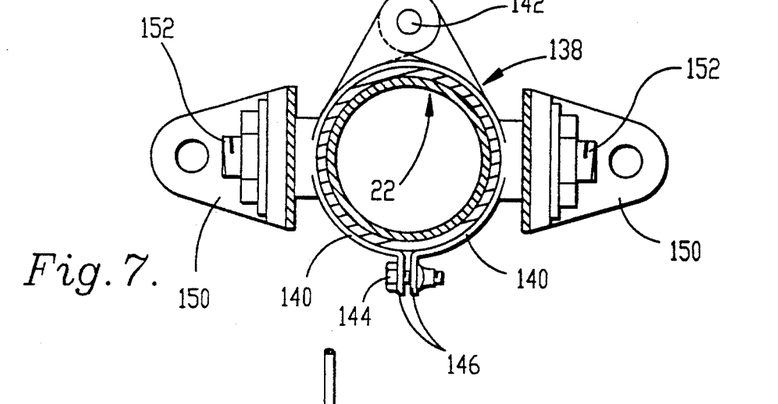
FIG. 7 is a cross-sectional view of the keel of a glider aircraft illustrating another modified construction of the support structure.

Another modification of the support assembly is illustrated in FIG. 6, wherein the assembly includes a support bar 120 that is secured for rotation on the keel 22 through a bearing assembly 122. Preferably, the bearing assembly includes a caged needle roller bearing including an outer bearing race 124 that is slid axially into position on the keel of an already constructed glider, and thereafter secured in a desired axial position on the keel so as to prevent further axial movement of the assembly. Alternatively, an inner race may be included as part of the assembly that is secured to the keel.

The outer sleeve of the keel 22 defines the inner race for the bearings, and is preferably double sleeved in order to increase the strength thereof. However, where the inner bearing race is included in the assembly, the inner race defines an outer, third sleeve. The outer bearing race is provided with a pair of depending lugs 126, each provided with a horizontal hole through which a pivot pin 128, such a bolt or the like, is provided. The support bar includes a forked element having a pair of upstanding arms 130, 132 which extend along either side of the keel. The support bar is mounted for pivotal movement on the pivot pin 128 in order to permit universal pivoting movement of the support bar relative to the keel.

A horizontal link 134 extends between the upper ends of the arms, and includes an eyelet 136 for receiving the cable 94. Additional eyelets may be provided on the arms as discussed above with reference to the construction illustrated in FIGS. 1–3, or all of the cables 94, 96, 98 leading from the support assembly may be fastened to the single eyelet 136.

Where it is desired that the support assembly be easily removable from the keel, it is possible to provide a construction as shown in FIG. 10, wherein the clamp 138 of the assembly includes a pair of symmetrical, opposed, clamp halves 140 which are connected together by a pivot pin 142 in order to permit the clamp halves to be moved toward and away from one another in a jaw-like fashion.

In order to install the clamp, the halves are opened and positioned around the keel 22, and thereafter closed and secured together by a bolt 144 or the like extending between upstanding tabs 146. Once this clamp construction has been secured to the keel of the glider, the vertical links of the linkage assembly 54 may be fastened to the brackets 150 for pivotal movement about the axes of attachment. The brackets 150 are supported on the clamp 138 for rotation about the axes of bolts 152 used to support the brackets on the clamp. Thus, universal pivoting movement of the linkage assembly is permitted.

Although not shown, it is possible to arrange the brackets 150 on the clamp so that the brackets are disposed beneath the keel. This construction increases the length of the links above the pivot point magnifying the effects of control movements.

Although the invention has been described with reference to the illustrated preferred constructions, it is noted that substitutions may be made and equivalents employed herein without departing from the scope of the invention as recited in the claims.

What is claimed is:

1. A flight control apparatus for use in an aircraft having a pair of wings and a keel extending between the wings, the apparatus comprising:

a support assembly adapted for connection to the keel for suspending a pilot from the keel beneath the wings and permitting movement of the pilot relative to the aircraft in the forward, rearward and both lateral directions relative to the aircraft; and a control means connected between the support assembly and the wings for mechanically altering the geometries of the wings during flight to vary the drag and lift characteristics of the wings, and alter the direction of flight of the aircraft, in response to movement of the pilot relative to the aircraft in any of the forward, rearward, and lateral directions.

2. A flight control apparatus as recited in claim 1, wherein upon movement of the pilot forward relative to the aircraft the control means alters the geometries of both wings to a geometry having decreased drag and increased lift.

3. A flight control apparatus as recited in claim 1, wherein upon movement of the pilot rearward relative to the aircraft the control means alters the geometries of both wings to a geometry having increased drag and decreased lift.

4. A flight control apparatus as recited in claim 1, wherein upon movement of the pilot laterally toward one of the wings, the control means alters the geometry of the wing to a geometry having increased drag and decreased lift while altering the geometry of the other wing to a geometry having decreased drag and increased lift in order to effect a turn in the direction of relative movement of the pilot.

5. A flight control apparatus as recited in claim 1, wherein each wing includes a leading edge movable between a retracted position and an extended position relative to the keel, and a non-rigid wing surface extending rearward from the leading edge, the non-rigid wing surface being supported on the leading edge under greater tension when the leading edge is in the extended position than when the leading edge is in the retracted position.

6. A flight control apparatus as recited in claim 5, wherein the support assembly includes a support bar mounted on the aircraft for universal pivotal movement and the pilot is supported from the support bar, the control means including a cable extending between the support bar and each of the leading edges for carrying out movement of the leading edges between the extended retracted positions when the pilot moves relative to the aircraft.

7. A flight control apparatus as recited in claim 6, wherein the support assembly includes a harness for supporting the pilot from the support bar.

8. A method of controlling the flight of an aircraft, wherein the aircraft includes a pair of wings, and a keel extending along the central longitudinal axis of the aircraft, each of the wings including a leading edge movable between retracted and extended positions relative to the central longitudinal axis and a non-rigid wing surface extending rearward from the leading edge, the non-rigid wing surface being supported on the leading edge under greater tension when the leading edge is in the extended position than when the leading edge is in the retracted position, the method comprising the steps of:

suspending a pilot from the keel beneath the wings on a support bar mounted for universal pivotal movement relative to the keel permitting movement of the pilot in the forward, rearward and both lateral directions relative to the aircraft;

mechanically altering the geometries of the wings during flight by moving the leading edges between the extended and retracted positions in response to movement of the support bar when the pilot moves in the forward, rearward and both lateral directions relative to the aircraft, the variation in geometry of the wings causing a change in the drag and lift characteristics of the wings and in the direction of flight of the aircraft.

9. A flight control method as recited in claim 8, wherein upon movement of the pilot forward relative to the aircraft the leading edges of the wings are moved toward the extended positions and the geometries of both wings are altered to a geometry having decreased drag and increased lift.

10. A flight control method as recited in claim 8, wherein upon movement of the pilot rearward relative to the aircraft the leading edges of the wings are moved toward the retracted positions and the geometries of both wings are altered to a geometry having increased drag and decreased lift.

11. A flight control method as recited in claim 8, wherein upon movement of the pilot laterally toward one of the wings, the leading edge of the one wing is moved toward the retracted position so that the geometry of the one wing provides increased drag and decreased lift while the leading edge of the other wing is moved toward the extended position so that the geometry of the other wing provides decreased drag and increased lift in order to effect a turn in the direction of relative movement of the pilot.

* * * * *